(12) United States Patent
Weston et al.

(10) Patent No.: US 9,199,640 B2
(45) Date of Patent: Dec. 1, 2015

(54) CONTROL OF ELECTRONIC LIMITED SLIP DIFFERENTIAL WHILE TOWING

(71) Applicant: FORD GLOBAL TECHNOLOGIES, LLC, Dearborn, MI (US)

(72) Inventors: Keith Weston, Canton, MI (US); James Gerard Cullen, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 14/193,358

(22) Filed: Feb. 28, 2014

(65) Prior Publication Data

US 2015/0246674 A1    Sep. 3, 2015

(51) Int. Cl.
| | | |
|---|---|---|
| *B62D 6/00* | (2006.01) | |
| *B60T 13/00* | (2006.01) | |
| *B60W 30/045* | (2012.01) | |
| *B60W 10/16* | (2012.01) | |
| *B60W 10/20* | (2006.01) | |
| *B60W 30/18* | (2012.01) | |
| *B60W 30/182* | (2012.01) | |

(52) U.S. Cl.
CPC ............ *B60W 30/045* (2013.01); *B60W 10/16* (2013.01); *B60W 10/20* (2013.01); *B60W 30/182* (2013.01); *B60W 30/18145* (2013.01); *B60W 30/18172* (2013.01)

(58) Field of Classification Search
USPC ................................................ 701/41; 303/7
See application file for complete search history.

(56) References Cited

U.S. PATENT DOCUMENTS

| | | | | |
|---|---|---|---|---|
| 5,747,683 | A   * | 5/1998  | Gerum et al. ............... | 73/117.01 |
| 6,609,056 | B1 * | 8/2003  | Czarnecki et al. .............. | 701/51 |
| 7,793,750 | B2   | 9/2010  | Ushiroda et al. | |
| 8,285,450 | B2   | 10/2012 | Ushiroda et al. | |
| 2003/0200016 | A1 * | 10/2003 | Spillane et al. .................. | 701/36 |
| 2005/0004732 | A1 * | 1/2005  | Berry et al. ..................... | 701/48 |
| 2005/0072255 | A1 * | 4/2005  | McCrary et al. ................ | 74/330 |
| 2006/0033308 | A1 * | 2/2006  | Waldbauer et al. ........ | 280/455.1 |
| 2006/0125313 | A1 * | 6/2006  | Gunne et al. ....................... | 303/7 |
| 2007/0032913 | A1 * | 2/2007  | Ghoneim et al. .................. | 701/1 |
| 2008/0177454 | A1 * | 7/2008  | Bond et al. ....................... | 701/70 |
| 2009/0005946 | A1 * | 1/2009  | Futamura et al. ............... | 701/70 |
| 2011/0297460 | A1 * | 12/2011 | Chess et al. ................... | 180/6.66 |
| 2012/0029779 | A1 * | 2/2012  | Dickinson et al. .............. | 701/69 |
| 2013/0231837 | A1   | 9/2013  | Holbrook et al. | |
| 2015/0134162 | A1 * | 5/2015  | Yamazaki et al. .............. | 701/22 |

\* cited by examiner

*Primary Examiner* — Thomas G Black
*Assistant Examiner* — Tyler Paige
(74) *Attorney, Agent, or Firm* — James Dottavio; Brooks Kushman P.C.

(57) ABSTRACT

A vehicle includes a control system for reducing oversteer by controlling an electronic limited-slip differential (eLSD). The eLSD has one or more clutches configured to selectively distribute a controlled and varied amount of drive torque between a pair of wheels during a turn. At least one controller is programmed to operate the eLSD in (i) a tow-mode in response to the vehicle towing an object and (ii) a non-tow-mode in response to the vehicle not towing an object. When operated in the tow-mode, the eLSD is controlled by the controller to actively reduce a difference in speed between the wheels compared to when the eLSD is operating in the non-tow-mode or is not operated in the tow-mode.

19 Claims, 5 Drawing Sheets

CONTROL OF ELECTRONIC LIMITED SLIP DIFFERENTIAL WHILE TOWING

TECHNICAL FIELD

The present disclosure generally relates to the control of an electronic slip differential (eLSD) in a vehicle while the vehicle is towing. The eLSD is controlled to correct oversteering of the vehicle that might otherwise occur during tight turns when the vehicle is towing another object.

BACKGROUND

Oversteer and understeer are operating conditions the vehicle may experience during a turn. Oversteer occurs when the vehicle turns more than the amount commanded by the driver. Conversely, understeer occurs when the vehicle turns less than the amount commanded by the driver.

Conventional electronic stability control (ESC) systems have been developed to correct oversteer or understeer in the vehicle. ESC systems detect a loss of steering control or a slip in one or more wheels of a vehicle. Braking force is applied to the wheels individually, such as the outer front wheel to counter oversteer or the inner rear wheel to counter understeer.

Differentials are also utilized to control stability, oversteer and understeer in vehicles. A conventional differential distributes torque evenly to the wheels such that the torque across the axle is designed to be at equilibrium. Limited slip differential (LSD) systems and eLSD systems can unevenly distribute torque across the axle between the wheels such that more or less torque can be sent to individual wheels based on one of the wheels slipping, for example.

SUMMARY

In one embodiment, a system for reducing oversteer in a vehicle is provided. An electronic limited-slip differential (eLSD) has a clutch pack actuated by a clutch pressure to alter an amount of driving force transmitted amongst a pair of wheels during a turn. At least one controller is programmed to operate the eLSD in a tow-mode in response to the vehicle towing an object. The controller is programmed to operate the eLSD in a non-tow-mode in response to the vehicle not towing an object.

The at least one controller may further be programmed to, when operating in the tow-mode, command a clutch pressure in the eLSD to an amount greater than an amount of clutch pressure in the eLSD when operating in the non-tow-mode for a given turn.

The at least one controller may further be programmed to, when operating in the tow-mode, command a clutch pressure in the eLSD to an amount different than an amount of clutch pressure otherwise commanded in the eLSD of a vehicle that does not include a tow-mode.

According to another embodiment, a method of controlling an eLSD in a vehicle is provided. The method includes operating the eLSD in a tow-mode in response to the vehicle towing. Clutch pressure is provided in a clutch in the eLSD to a first amount in response to operating in the tow-mode during a given turn. The first amount of clutch pressure is different than a second amount of clutch pressure provided in the clutch in an absence of the tow-mode for the given turn.

According to another embodiment, a vehicle comprises an eLSD mechanically coupling wheels of the vehicle, and a controller. The controller is programmed to distribute drive torque between the wheels via the eLSD according to an in-tow force acting upon a rear of the vehicle during a turn of the vehicle. The detection of the in-tow force may prompt the controller to control the eLSD in a tow-mode in which the eLSD operates differently than when there is no in-tow force. During a turn, the vehicle includes an inner-turn wheel and an outer-turn wheel. The controller may be further programmed to, in response to the vehicle operating in the tow mode, increase an amount of drive torque distributed to the outer-turn wheel during the turn to reduce oversteering of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In vehicles, a differential is provided to couple the drive shaft to an axle that mechanically couples two driving wheels. Power transfers from one or more power source (e.g., engine, motor) in one direction and changes direction towards the wheels via the differential and along two output shafts of the differential. When the operator of the vehicle turns the vehicle, the outer-wheels of the vehicle spin faster than inner-wheels along the turn.

Limited-slip differentials (LSDs) have been introduced that have a gear train that allows the output shafts of the differential to spin at different speeds while maintaining the sum of their speeds proportional to the input of the differential. LSDs may also include one or more clutches that create a resistance torque between the two output shafts of the differential. This allows different amounts of torque to be transferred to the inner-wheel compared to the outer-wheel during a turn.

Electronic limited-slip differentials (eLSD) include a computer or other controller that controls the amount of clamping force in the clutch pack in the differential. This provides a computerized control of the clutch pressure in the eLSD in order to selectively deliver various amounts of torque to the two common-axle wheels.

Figure 1:
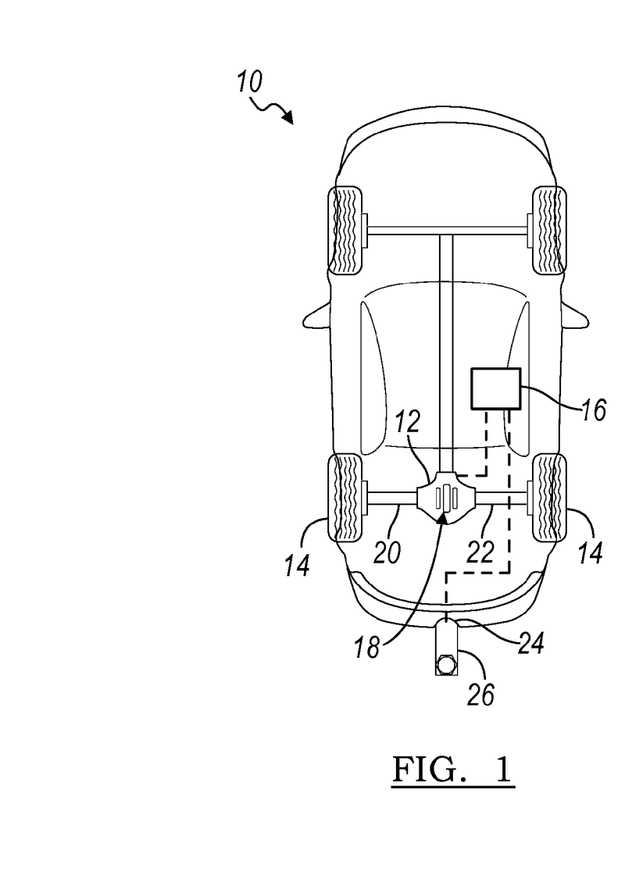
FIG. 1 is a schematic top view of a vehicle having an eLSD, according to one embodiment.

Referring to FIG. 1, a vehicle 10 is provided having an eLSD 12 that selectively distributes torque to a pair of wheels 14. The eLSD 12 is controlled by at least one controller 16, computer, or other such network of interconnected controllers in a control system. The controller 16 is programmed or otherwise configured to provide control signals to a hydraulic pump (not shown) to supply hydraulic pressure to a clutch pack 18. As more pressure is provided in the clutch pack 18, gears in the eLSD cause the difference in speeds of the output shafts 20, 22 to approach zero and "lock up." This increases an understeer moment in the vehicle, as will be described in further detail below. The vehicle also includes a tow member receptacle 24 at the rear of the vehicle that is configured to receive a tow member 26, such as a tow hitch. The controller 16 may be electrically coupled to a sensor on our around the tow member receptacle 24 or tow member 26 such that the controller is able to detect when the vehicle is towing another object, as will be described in further detail below.

Oversteer and understeer conditions may be realized in the vehicle when the vehicle is turning. In short, oversteer occurs when a vehicle turns by more than the amount commanded by the operator. Conversely, understeer occurs when a vehicle turns by less than the amount commanded by the operator. Lateral acceleration of the vehicle during the turn may, in some instances, be large enough to cause yaw rotation of the vehicle that is undesirable, causing the vehicle to turn in a direction that differs from that commanded by the operator. External forces exerted on the vehicle can also cause the vehicle to oversteer or understeer.

Figure 2:
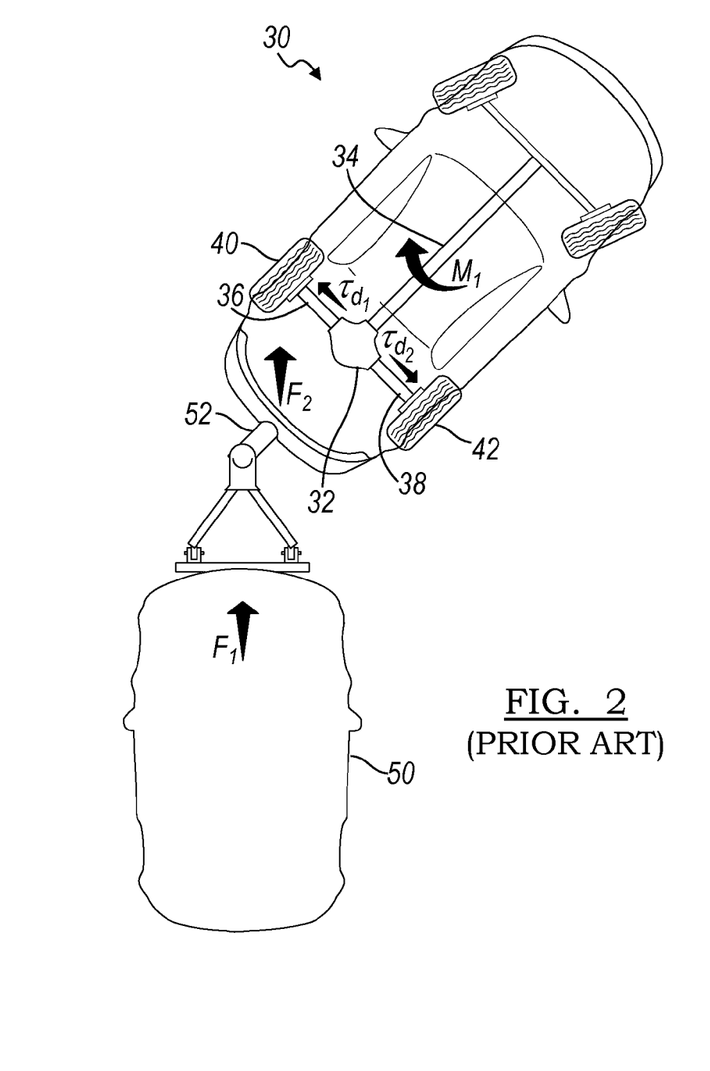
FIG. 2 is a schematic top view of a vehicle experiencing overturn while towing another vehicle during a turn.

Referring to FIG. 2, a vehicle 30 includes a differential, such as an LSD 32. The LSD 32 transmits driving force from an input axis 34 into drive torque that is transmitted to first and second output shafts 36, 38. The drive torque transmitted to the outer-wheel 40 along the first output shaft 36 is represented by $\tau_{d_1}$, and the drive torque transmitted to the inner-wheel 42 along the second output shaft 38 is represented by $\tau_{d_2}$. Clutches or other known devices may dictate the magnitude of $\tau_{d_1}$ and $\tau_{d_2}$.

An external force $F_1$ is exerted on the vehicle 30. The force F1 may be provided from, for example, a towed vehicle 50 attached to a tow hitch 52 of the vehicle 30. The force $F_1$ may be provided from any other object acting upon the rear of the vehicle, and towing another vehicle is merely exemplary. As the vehicle 30 turns, the force $F_1$ is transmitted from the towed vehicle 50 to the vehicle 30, indicated at $F_2$. Because the vehicle is turning, the force $F_2$ provides a lateral force transverse to the intended direction of travel; the force $F_2$ "pushes" the rear of the vehicle. This causes a yaw moment $m_1$ about the front wheels in a clockwise direction for a right-hand turn (and, conversely, in a counter-clockwise direction for a left-hand turn). The yaw moment $m_1$ can force the rear wheels 40, 42 to slip, causing the vehicle to oversteer.

Figure 3:
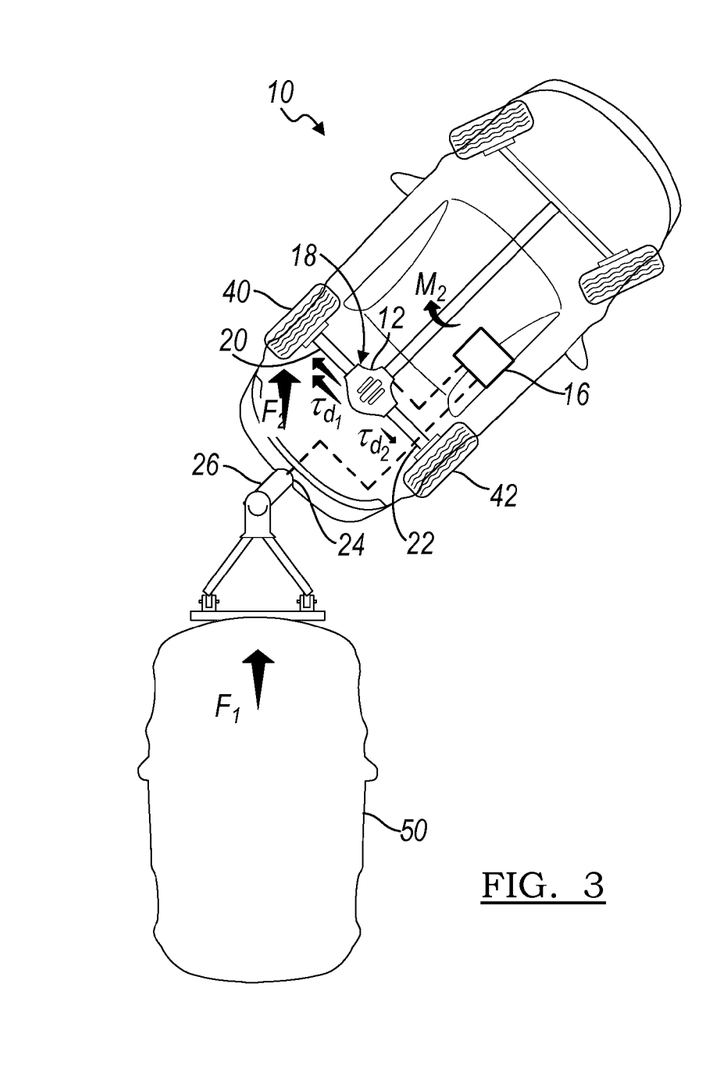
FIG. 3 is a schematic top view of a vehicle implementing control over the eLSD while towing another vehicle during a turn to reduce the overturn, according to one embodiment.

FIG. 3 illustrates a different vehicle than in FIG. 2; namely, the vehicle 10 is that of FIG. 1. The vehicle 10 includes an eLSD 12 that is controlled via controller 16 to selectively deliver a commanded amount of torque via output shafts 20, 22 to the rear wheels 40, 42, respectively. The controller 16 is also capable of detecting if/when the vehicle is towing an object, such as towed vehicle 50. By doing so, the controller can control the operation of the eLSD 12 in a tow-mode when the vehicle 10 is towing, and a non-tow-mode or normal mode when the vehicle is not towing.

When the vehicle 10 is towing, the controller 16 alters its normal operating parameters and trigger conditions to accommodate for the external forces $F_1$ and $F_2$ exerted on the vehicle 10. In particular, the controller 16 will command an increased amount of clutch pressure in the clutch pack 18 when operating in the tow-mode than when operating in the non-tow-mode for a given turn. When the vehicle travels about a given turn at a given velocity when not towing, the controller commands various amounts of clutch pressure as the vehicle enters and exits the turn. When the vehicle travels about the same turn at the same velocity when towing, the control of the clutch pressure in the eLSD will be modified so as to operate at different magnitudes when entering and exiting the turn compared to when the vehicle was not towing. The different amount of clutch pressure in the eLSD when the vehicle is operating in the tow mode counters the forces transmitted by the towed object. For example, increased amounts of clutch pressure when the vehicle 10 enters the turn can attempt to "lock up" the relative speeds of the wheels 40, 42. This causes an increase in drive torque $\tau_{d_1}$ transmitted to the outer wheel 40 and a reduction in the drive torque $T_{d_2}$ transmitted to the inner wheel 42. Therefore, when entering at turn (e.g., the time at which the force $F_1$ applied on the vehicle 10 may be at its greatest), the controller 16 and eLSD 12 cooperate to reduce the amount of oversteer by increasing the clutch pressure during the turn that would otherwise not occur when the vehicle 10 is not towing.

Figure 4:
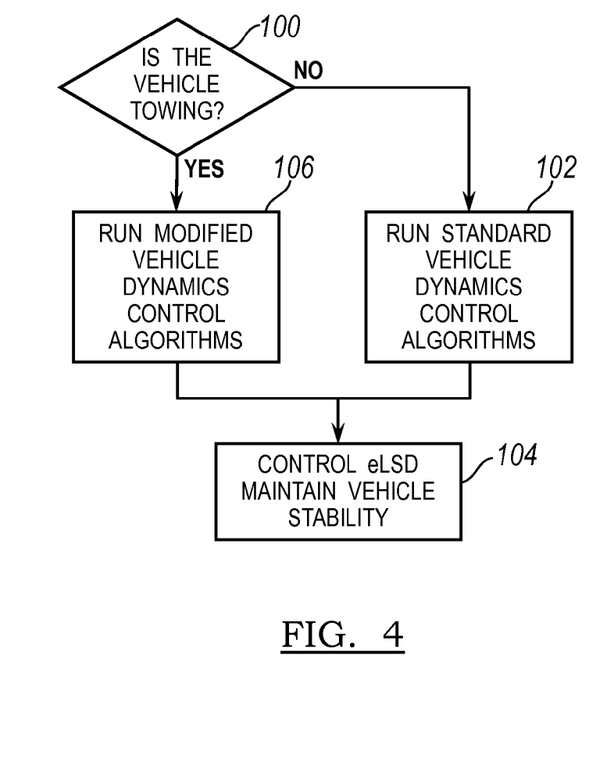
FIG. 4 is a flow chart illustrating a computer-implemented method of controlling the eLSD based on whether the vehicle is towing.

FIG. 4 illustrates one exemplary flow chart of an algorithm utilized by the at least one controller 16. At 100, the controller determines whether the vehicle is towing. This can be accomplished by one or more of the various methods described herein. If the vehicle is not towing, then at 102 the controller will run standard vehicle dynamics and control algorithms that are utilized in previous eLSD systems. Control of the eLSD will attempt to maintain vehicle stability at 104 by utilizing the standard control algorithms. If, however, the controller determines that the vehicle is towing, then at 106 the controller will run modified vehicle dynamics and control algorithms in its control of the eLSD in order to maintain vehicle stability at 104. The modified control algorithms of 106 can supersede or otherwise be used in place of the standard control algorithms of 102 when the vehicle is operating in the tow-mode.

Figure 5:
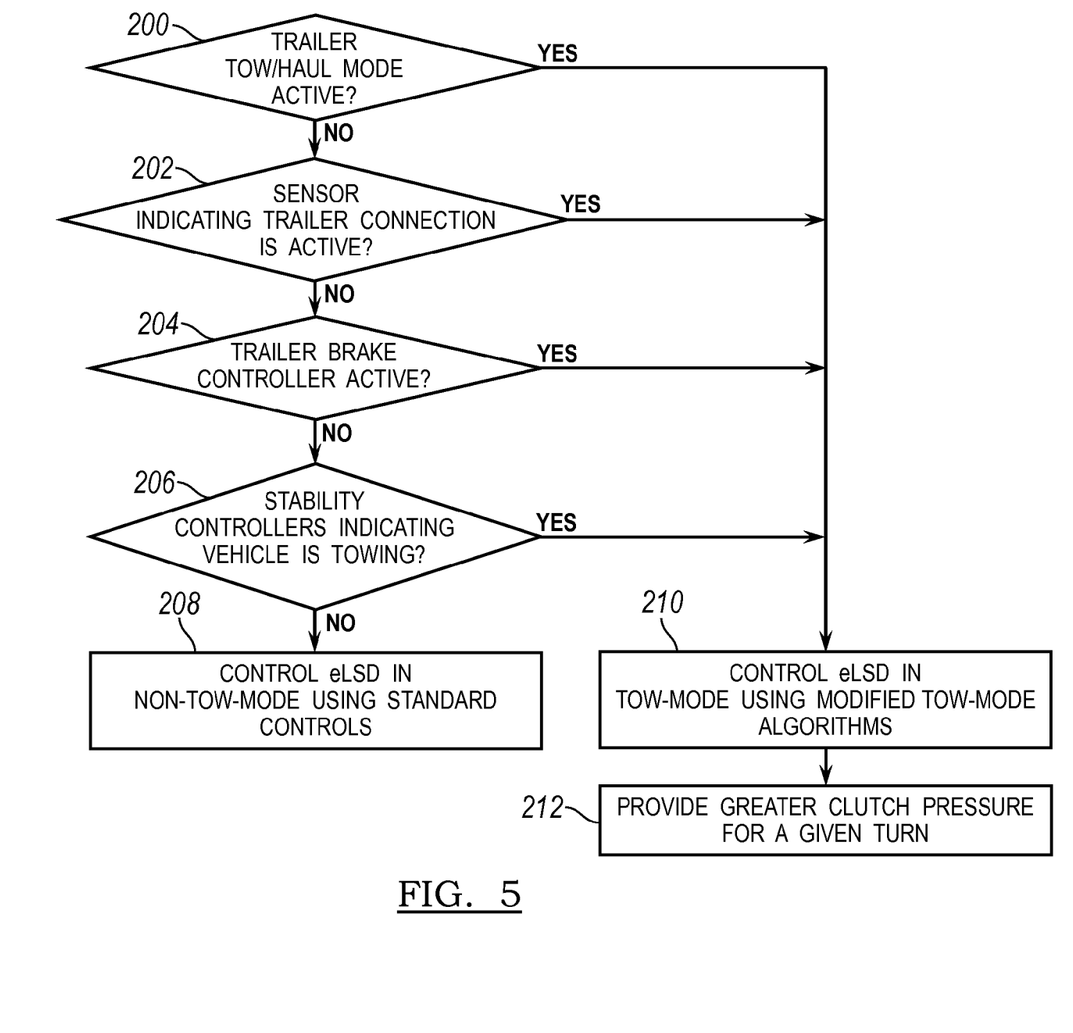
FIG. 5 is another flow chart illustrating a computer-implemented method of controlling the eLSD based on whether the vehicle is towing.

FIG. 5 is an exemplary algorithm implemented by the controller 16 to determine whether the vehicle 10 is towing another object, such as another vehicle. At 200, the controller determines whether a trailer tow/haul mode is active. This can be indicated by a physical switch or button on a lever on or around the steering wheel or center console, for example. The tow/haul mode button may be on a liquid crystal display (LCD) user interface. Other examples are contemplated. When the tow/haul mode button is activated, a transmission controller reduces shift cycles or otherwise changes the transmission's shift patterns in order to allow the engine to operate at higher RPMs before shifting. Activation of the tow/haul mode button is one way of indicating a desire to activate the tow-mode in the eLSD control.

At 202, the controller determines whether a sensor indicates that a trailer connection is active. For example, as previously described a proximity or contact sensor may be present in the tow hitch receptacle at the rear of the vehicle that indicates the presence of a tow hitch being attached. Alternatively, a sensor such as a tension sensor may be disposed on the tow hitch that detects a compression/tension force present in the tow member, indicating the presence of an object being towed. In another example, a rearward facing camera or proximity sensor at the rear of the vehicle can detect the presence of a vehicle immediately behind the rear of the vehicle. In yet another example, an electronic sensor can indicate an electrical connection active between tail lights of the vehicle and tail lights of the towed vehicle. Other examples are contemplated that indicate a towed vehicle being connected to and towed by the vehicle.

At 204, the controller determines whether the trailer brake controller is active. A trailer brake controller is a device that supplies electric energy from the towing vehicle to electric brakes in the trailer or towed vehicle. The trailer brake controller may be either a proportional brake controller or a time-delayed (or solid state) brake controller. A proportional brake controller senses the amount of applied brake power being applied in the towing vehicle and applies the same amount of braking power to the electric brakes of the trailer. A time-delayed brake controller sends a predetermined amount of braking power to the electric brakes of the trailer when the operator of the towing vehicle steps on the vehicle brakes. A time-delay is present as the time-delayed brake controller ramps up to full braking power. If either of these trailer brake controllers is connected and active, it may be inferred that the eLSD should be operated in the tow-mode.

At 206, the controller determines whether the vehicle is towing based on force or velocity sensors present throughout the vehicle. For example, if the vehicle is turning, one or more sensors may detect the presence of a yaw force exceeding a threshold, indicating that an object is pushing the rear of the vehicle and causing oversteer, as previously described.

It should be understood that the determinations made in steps 200-206 are merely exemplary as means for determining that the vehicle 10 is towing another object, such as another vehicle.

If the results of all of the determinations in 200-206 results in a "no," the controller operates the eLSD in a non-tow-mode using standard known controls at 208. If, however, the result of any of 200-206 results in a "yes," the controller operates the eLSD in a tow-mode using modified tow-mode algorithms at 210. When the controller operates the eLSD in the tow-mode, and if the eLSD includes a clutch pack with hydraulically-activated clutches, a greater amount of clutch pressure is commanded when entering a given turn than the amount of clutch pressure commanded when the vehicles enters the same given turn when the eLSD is operated in the non-tow-mode, as previously described.

It should be understood from the description provided herein that the controller 16 can operate the eLSD in either a tow-mode or a non-tow-mode, depending on several factors outlined above. When the eLSD is operated in the tow-mode, the controller can command an increased amount of clutch pressure when entering, traveling through, or exiting a given turn than when the eLSD is operated in the non-tow-mode along the given turn. There may be instances in which the commanded pressure in the eLSD is lower in the tow-mode than when in the non-tow-mode. In either event, it should be understood that the eLSD is controlled differently to distribute drive torque at different rates when the controller is operating in the tow-mode than when the controller is operating in the non-tow-mode.

Figure 6A:
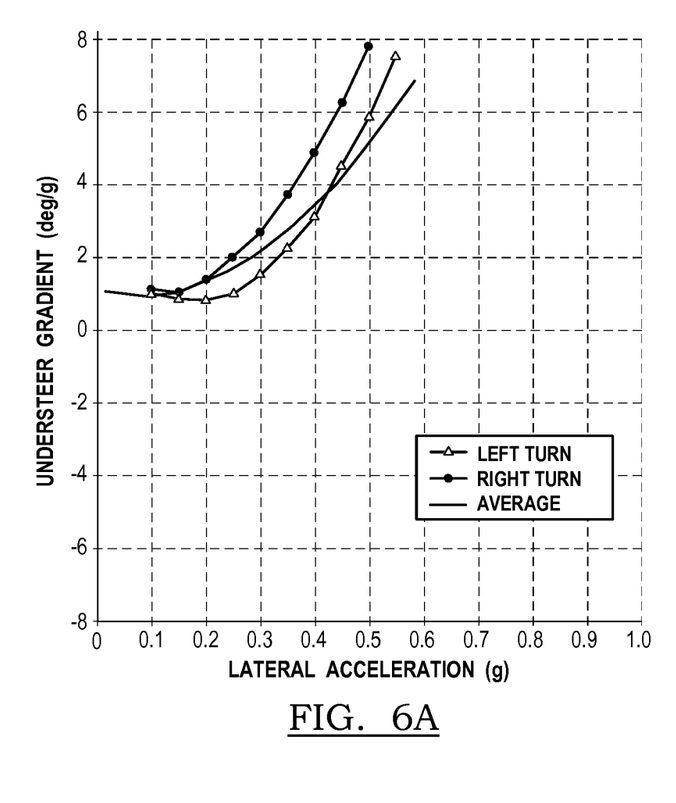
FIG. 6A is a graphical representation of understeer gradients for a given turn when the vehicle is operating in a non-tow-mode.
Figure 6B:
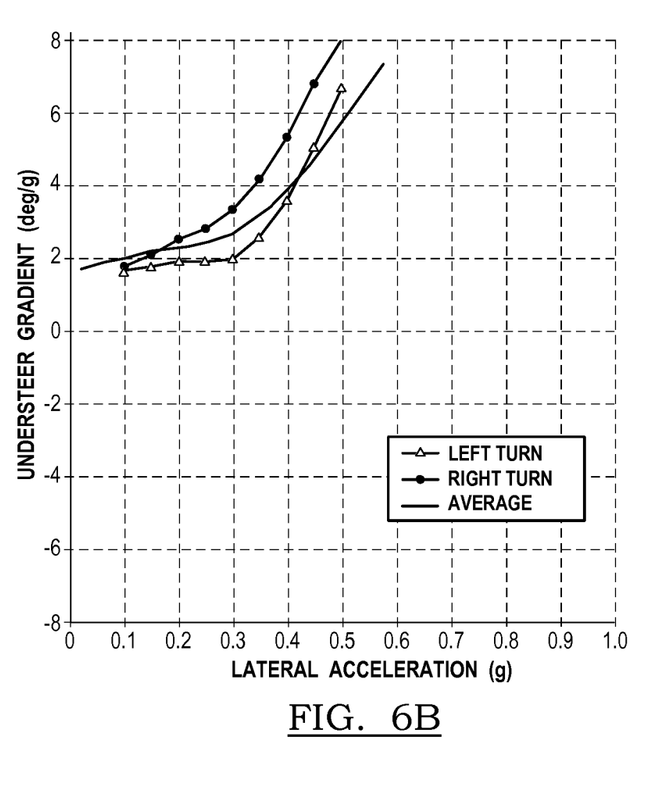
FIG. 6B is a graphical representation of understeer gradients for the given turn when the vehicle is operating in a tow-mode.

FIGS. 6A and 6B illustrate an amount of understeer gradients provided by the eLSD during a given turn for given lateral acceleration when the vehicle is towing. FIG. 6A illustrates results during a given turn when the eLSD does not include the tow-mode algorithms, and FIG. 6B illustrates results during the given turn with the tow-mode capabilities in the eLSD. Both Figures show the understeer gradients (deg/g) for a given right turn and a given left turn, as well as the average of both understeer gradient results.

In FIG. 6A, when the lateral acceleration is 0.3 g of force or less, the minimum of the average understeer gradient is roughly 0.99 deg/g. In comparison, in FIG. 6B with the eLSD operating in the tow mode, when the lateral acceleration is 0.3 g or less, the minimum of the average understeer gradient is roughly 1.71 deg/g. As can be see, an increased amount of understeer, and thus less oversteer, is realized in the vehicle. This is accomplished by the controller operating the eLSD in the tow mode and commanding more pressure in the eLSD to equalize the speeds of the outer and inner wheels. As will be described below, additional pressure in the eLSD can be commanded when the lateral acceleration is low when the vehicle enters a given turn, thus reducing the oversteer that might otherwise be realized when the vehicle travels through the turn.

The results of FIGS. 6A and 6B are merely exemplary for one given turn. The term "given turn" should be understood to mean the same traveled path at the same vehicle characteristics when entering the turn (e.g., vehicle velocity, load of vehicle, load of towed vehicle, surface grade, road turn radius, etc.). For example, the results of FIG. 6A show the understeer gradient of the vehicle and towed object around turn when the vehicle has a commanded vehicle speed throughout the turn. FIG. 6B shows the understeer gradient of the same exact vehicle and towed object around the same turn when the vehicle has the same characteristics, such as speed.

Figure 7A:
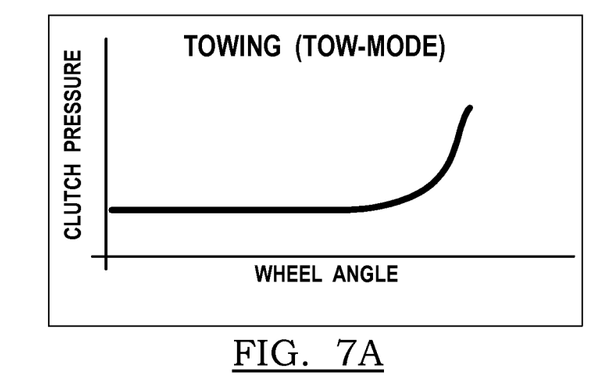
FIG. 7A is a graphical representation of clutch pressure in the eLSD versus wheel angle when operating in the tow-mode for a given turn.

FIGS. 7A illustrates clutch pressure versus wheel angle for a given turn when the controller is controlling the eLSD utilizing the tow-mode algorithms as previously described. When the vehicle is in tow mode, clutch pressure increases as the wheel angle increases. This may indicate a clutch pressure change as the vehicle enters a turn.

Figure 7B:
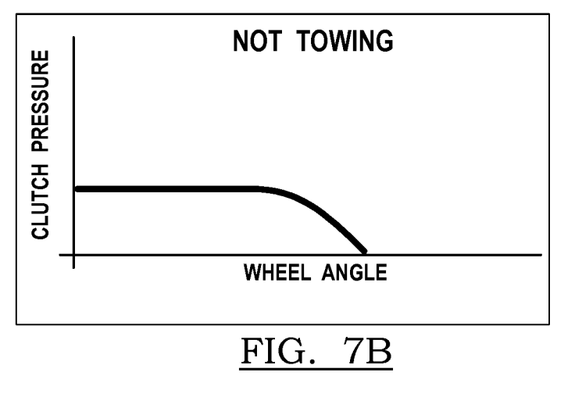
FIG. 7B is a graphical representation of clutch pressure in the eLSD versus wheel angle when operating in the non-tow-mode for the same given turn.

In contrast, when the vehicle is operating in the non-tow-mode, the clutch pressure may decrease when the vehicle enters a turn. This is illustrated in FIG. 7B as the clutch pressure reduces as the wheel angle increases.

Figure 8:
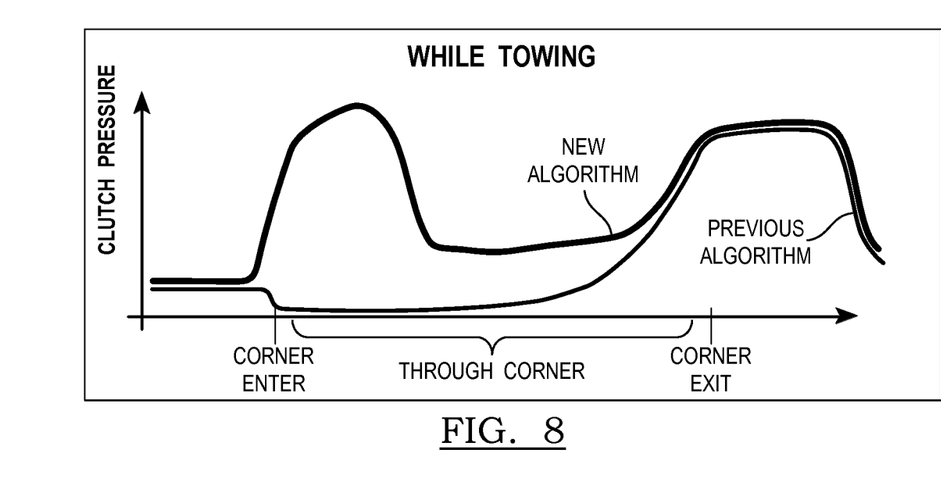
FIG. 8 is a graphical comparison of clutch pressure in the eLSD for a given turn when the vehicle is operating with tow-mode algorithms compared to an absence of the tow-mode algorithms.

Referring to FIG. 8, clutch pressure in the eLSD as commanded by the controller is illustrated while the vehicle is entering and exiting a turn around a corner while towing. The entering and exiting of a turn can be determined by wheel angle, for example, where a zero wheel angle can indicate the time before a corner enter and the time after a corner exit. Other methods of determining corner enter/exit are contemplated.

According to previous standard eLSD control algorithms that do not include a tow-mode, the clutch pressure is initially reduced as the vehicle enters the corner. This can occur even when the vehicle is towing, possibly leading to an overturn condition in the towing vehicle. The clutch pressure utilizing the standard algorithms slightly increases throughout the turn, followed by a sharp increase in pressure when the vehicle is exiting the turn.

In contrast, with the tow-mode eLSD control algorithms, the clutch pressure increases at the beginning of the turn. In other words, the amount and rate of increase is clutch pressure is greater when the vehicle is operating in a tow-mode than when the vehicle has no tow-mode capabilities. This works to reduce the difference in speeds between the outer- and inner-turn wheels. With an early increase in clutch pressure, understeering is increased throughout the turn, reducing the magnitude of overturn when the vehicle begins to exit the corner.

While reference is made to "clutch pressure" above, it should be understood that other similar representations can be made for other types of eLSDs that do not include hydraulic clutches. The eLSD may be of a different type of differential with different clutches, such as pneumatic clutches or electromechanical clutches. For example, if the eLSD includes electro-mechanical clutches, the magnitude of magnetic flux may alter the slip amount in the electro-mechanical clutch. The present disclosure is intended to include use of any active differential or torque vectoring technology used to control the tow vehicle and trailer combination including, but not limited to, hydraulic, pneumatic, or electromechanical actuation. Therefore, the clutch pressure descriptions and graphical representations should be taken as mere examples that illustrate that the operation of the eLSD differs when the vehicle is in tow-mode versus non-tow-mode, and differs when the vehicle is towing in a tow-mode versus towing without a tow-mode.

It should be understood that while the eLSD is illustrated at the rear axle of the vehicle, the differential can be on either or both axles depending on vehicle powertrain configuration. For example, all-wheel drive vehicles with two differentials may include controlling either or both of the differentials to achieve the reduced oversteering according to the methods described above.

It should also be understood that the eLSD control system described above can be applicable for a non-hybrid, hybrid, electric, plug-in electric vehicles, or any other type of vehicle having at least one power plant configured to provide propulsion power to the wheels of the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for reducing oversteer in a vehicle comprising:
an electronic limited-slip differential (eLSD) having a clutch pack actuated by a clutch pressure to alter an amount of driving force transmitted amongst a pair of wheels during a turn; and
at least one controller programmed to operate the eLSD in (i) a tow-mode in response to the vehicle towing an object and (ii) a non-tow-mode in response to the vehicle not towing an object.

2. The system of claim 1, wherein the at least one controller is further programmed to, when operating in the tow-mode, command a clutch pressure in the eLSD to an amount different than an amount of clutch pressure in the eLSD when operating in the non-tow-mode for a given turn.

3. The system of claim 2, wherein the at least one controller is further programmed to, when operating in the tow-mode, increase the clutch pressure in the eLSD to an amount greater than the amount of clutch pressure in the eLSD when operating in the non-tow-mode for a given turn.

4. The system of claim 1, wherein the at least one controller is further programmed to, when operating in the tow-mode, command a clutch pressure in the eLSD to an amount different than an amount of clutch pressure in the eLSD in an absence of the tow-mode.

5. The system of claim 1, wherein when the eLSD is operating in the non-tow-mode the pair of wheels define a first difference in wheel speed during a given turn, and wherein when the eLSD is operating in the tow-mode the at least one controller is further programmed to reduce the difference in wheel speed to a second difference less than the first for the given turn.

6. The system of claim 1, wherein the at least one controller is further programmed to increase an equalization of torque transmitted amongst the pair of wheels when operating in the tow-mode compared to when operating in the non-tow-mode.

7. The system of claim 1, further comprising a tow coupler sensor configured to detect a towed object coupled to the vehicle for towing, wherein the at least one controller is further programmed to operate the eLSD in the tow-mode in response to the sensor indicating the towed object being coupled to the vehicle.

8. A method of controlling an electric limited-slip differential (eLSD) in a vehicle, the method comprising:
operating the eLSD in a tow-mode in response to the vehicle towing; and
providing a first amount of clutch pressure in a clutch in the eLSD in response to operating in the tow-mode during a given turn; and
providing a second amount of clutch pressure in the clutch when not operating in the tow-mode during the given turn.

9. The method of claim 8, wherein the first amount is greater than the second amount of clutch pressure provided in an absence of the tow-mode for the given turn.

10. The method of claim 8, wherein the step of providing the first amount includes increasing the first amount of clutch pressure in response to the vehicle beginning to turn into the given turn.

11. The method of claim 10, further comprising increasing the first clutch pressure in response to the vehicle beginning to exit the given turn.

12. The method of claim 8, further comprising operating the eLSD in a non-tow-mode in response to the vehicle not towing, and providing a first clutch pressure profile throughout the given turn in the tow-mode that differs from a second clutch pressure profile throughout the given turn in the non-tow-mode.

13. A vehicle comprising:
an electronic limited-slip differential (eLSD) mechanically coupling wheels of the vehicle; and
a controller programmed to distribute drive torque between the wheels via the eLSD according to an in-tow force acting upon a rear of the vehicle during a turn of the vehicle.

14. The vehicle of claim 13, further comprising an inner-turn wheel and an outer-turn wheel, wherein the in-tow force prompts the controller to operate the eLSD in a tow-mode, wherein the controller is further programmed to, in response to the vehicle operating in the tow mode, increase an amount of drive torque distributed to the outer-turn wheel during the turn to reduce oversteering of the vehicle.

15. The vehicle of claim 13, further comprising an inner-turn wheel and an outer-turn wheel, wherein the controller is further programmed to (i) command a first amount of drive torque to be distributed to the outer-turn wheel according to an in-tow force acting upon the rear of the vehicle during the turn, and (ii) command a second amount of drive torque to be distributed to the outer-turn wheel according to an absence of the in-tow force.

16. The vehicle of claim 13, wherein the eLSD includes at least one clutch actuated by hydraulic pressure and configured to variably deliver an amount of the drive torque to each of the wheels.

17. The vehicle of claim 16, wherein the controller is programmed to operate the eLSD in (i) a tow-mode in response to the vehicle towing an object and (ii) a non-tow-mode in response to the vehicle not towing an object.

18. The vehicle of claim 17, wherein the controller is programmed to, when operating in the tow-mode, increase the pressure in the eLSD to an amount greater than the amount of pressure in the eLSD when operating in the non-tow-mode for a given turn.

19. The vehicle of claim 13, wherein the eLSD includes at least one of a pneumatic clutch, a hydraulic clutch, and an electromechanical clutch configured to variably deliver an amount of the drive torque to each of the wheels.

* * * * *